United States Patent

[11] 3,603,931

[72] Inventors Ronald H. Britt;
Peter C. Matthews, both of Ilford, England

[21] Appl. No. 842,200
[22] Filed July 16, 1969
[45] Patented Sept. 7, 1971
[73] Assignee The Plessey Company Limited
Ilford, England
[32] Priority July 18, 1968, July 18, 1968, July 18, 1968
[33] Great Britain
[31] 34242/68, 34244/68 and 34245/68

[54] OPTICAL CHARACTER RECOGNITION SYSTEM INCLUDING A MATRIX OF SCANNED PHOTOSENSITIVE ELEMENTS
3 Claims, 3 Drawing Figs.

[52] U.S. Cl. 340/146.3 J
[51] Int. Cl. G06k 9/12
[50] Field of Search 340/146.3

[56] References Cited

UNITED STATES PATENTS

| | | | |
|---|---|---|---|
| 3,106,699 | 10/1963 | Kamentsky | 340/146.3 X |
| 3,159,815 | 12/1964 | Groce | 340/146.3 |
| 3,197,736 | 7/1965 | Leightner et al. | 340/146.3 |
| 3,339,178 | 8/1967 | Hardin | 340/146.3 |
| 3,492,647 | 1/1970 | Otten et al. | 340/146.3 |
| 3,496,542 | 2/1970 | Rabinow | 340/146.3 |

*Primary Examiner*—Maynard R. Wilbur
*Assistant Examiner*—Leo H. Boudreau
*Attorney*—Blum, Moscovitz, Friedman & Kaplan

ABSTRACT: A method of optical character recognition comprising utilizing a photohead having a matrix of photosensitive elements which are scanned successively and sampling the signals obtained during each scan for the purpose of detecting the presence of signals appertaining to a characteristic feature of one or more characters. The same feature may occur in several different characters but the features are chosen such that a different distinctive combination of features obtains for each character.

Figure 1:
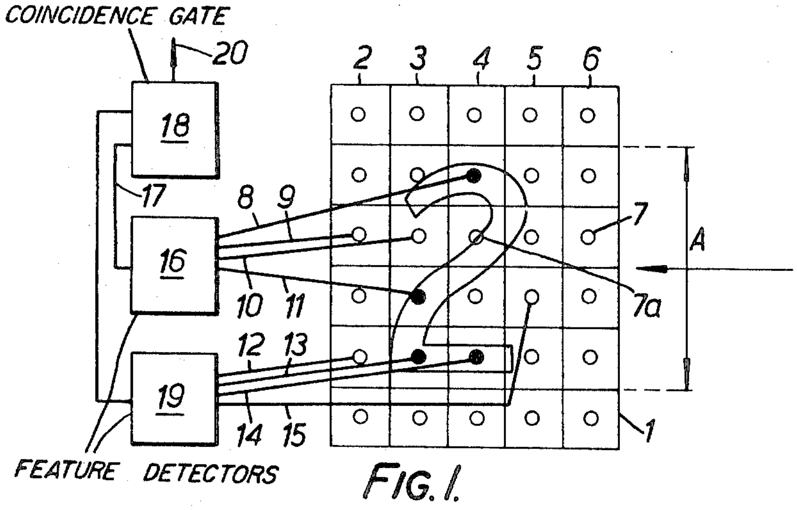

OPTICAL CHARACTER RECOGNITION SYSTEM INCLUDING A MATRIX OF SCANNED PHOTOSENSITIVE ELEMENTS

This invention relates to optical character recognition systems.

The invention is more especially concerned with optical character recognition systems comprising a photohead having a matrix of photosensitive elements which are successively scanned. A light and shade pattern on the matrix which is characteristic of a character to be recognized will produce at each coordinate point of the matrix, whereat a photosensitive element is positioned, a particular electrical signal, the pattern of electrical signals produced being characteristic of the character scanned. If it is required for example to recognize numbers it will be appreciated that each number when oriented in a particular manner with respect to the matrix, will produce a corresponding pattern of electrical signals characteristic of its configuration. It has been found however that recognition of such patterns, particularly if relative movement between the characters and the photohead is required, presents many technical difficulties.

According to the present invention an optical character recognition system comprises utilizing a photohead having a matrix of photosensitive elements and sampling signals obtained from the elements for the purpose of detecting the presence of signals appertaining to a characteristic feature of one or more characters, and arranging for the delivery of a signal which indicates that a particular character has been recognized when a predetermined number of features common to that character have been detected.

The same feature may occur in several different characters but the features are chosen such that a different distinctive combination of features obtains for each character. If therefore a particular combination of features is detected during one scan, or during a predetermined number of scans, the character represented by that particular feature combination is recognized.

It will be appreciated that if a black ink printed character is scanned on a white background the signal from a photosensitive element on the matrix receiving a signal from a black part of the character will be clearly distinguishable from the signal from a photosensitive element which receives a signal from a white part of the background. It will be apparent that if the ink density is low or if a particular photosensitive element is only partially exposed to a black ink pattern, the distinguishability of the signals is considerably reduced.

It is an important aspect of the present invention to provide a system whereby a feature may be reliably detected taking into account the signal variations from a photohead as just before described. To recognize a feature it is necessary to monitor directly or indirectly the electrical state of various points on the matrix and when a feature is present a predetermined number of specific points should register signals indicative of black points and a predetermined number of specific points on the matrix should register signals indicative of white points. When these conditions obtain, a 'fit' is said to have occurred and a feature is recognized.

In order to reliably detect this condition according to the above mentioned important aspect of the invention the most positive of one group of negative expected signals originating from the matrix is compared with the most negative of a second group of positive expected signals originating from the matrix.

If for example a positive signal is indicative of a black point and a less positive or negative signal is indicative of a white point then for a 'fit' to obtain, the least positive signal in the said one group should be more positive than the most positive signal in the said second group. It will be appreciated that if in accordance with the invention the whitest black point is compared with the blackest white point the result of this comparison provides a reliable method of feature detection.

Figures 2, 2A:
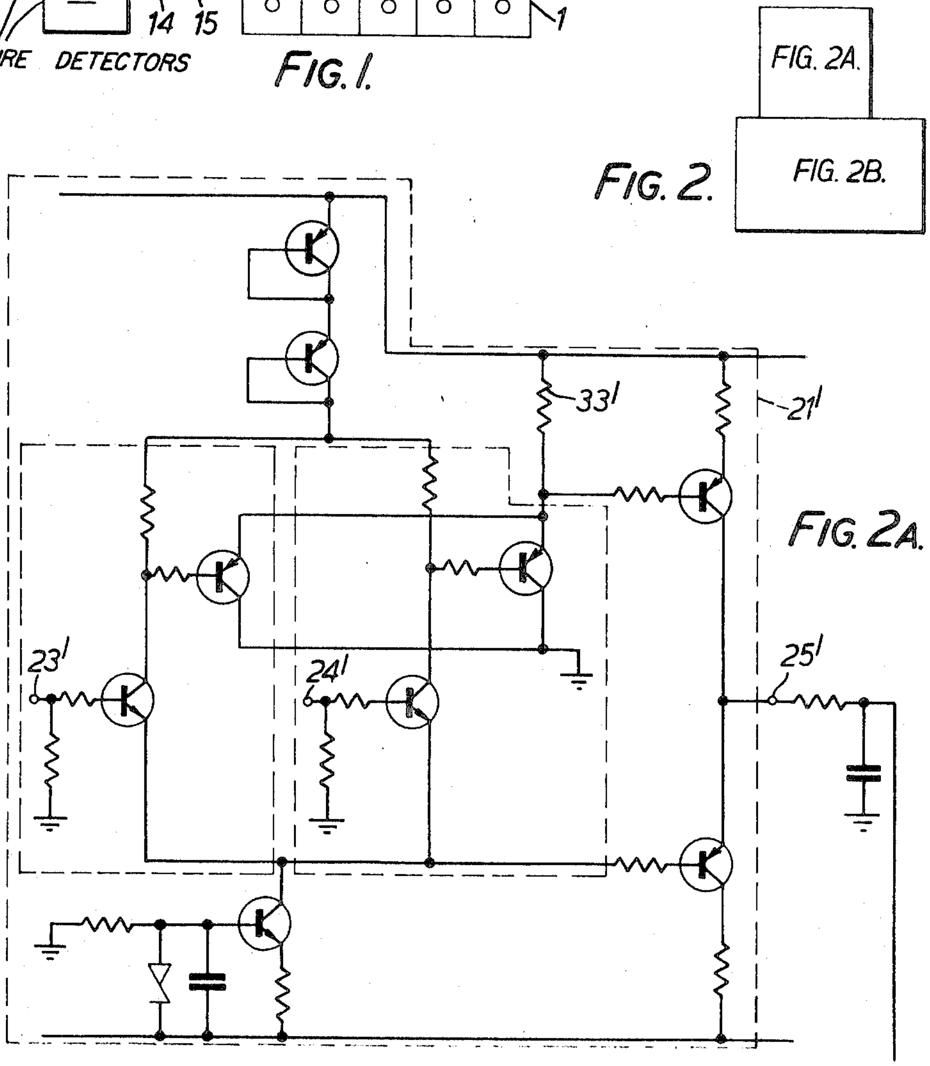
Figure 2B:
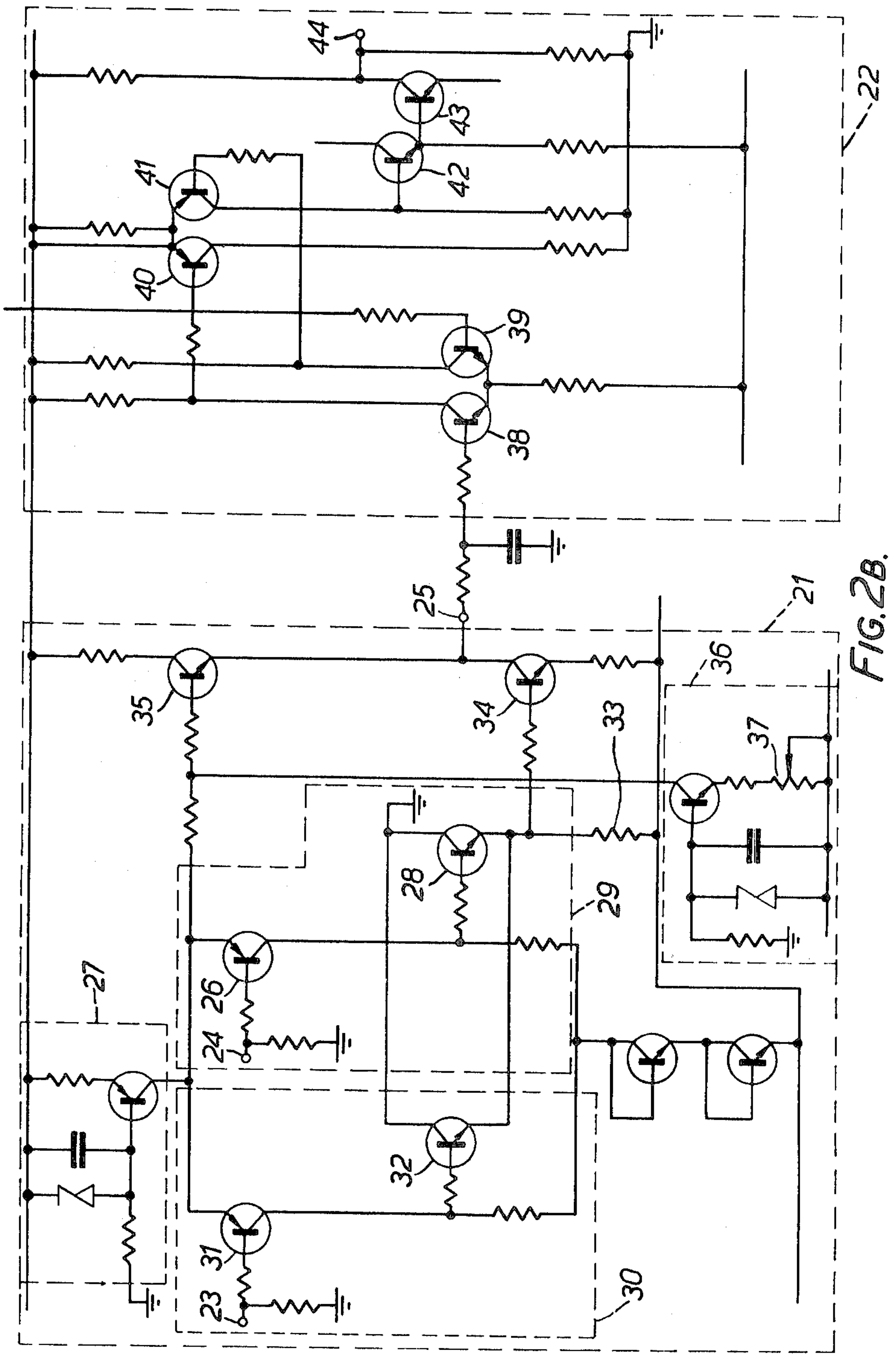
Figure 3:
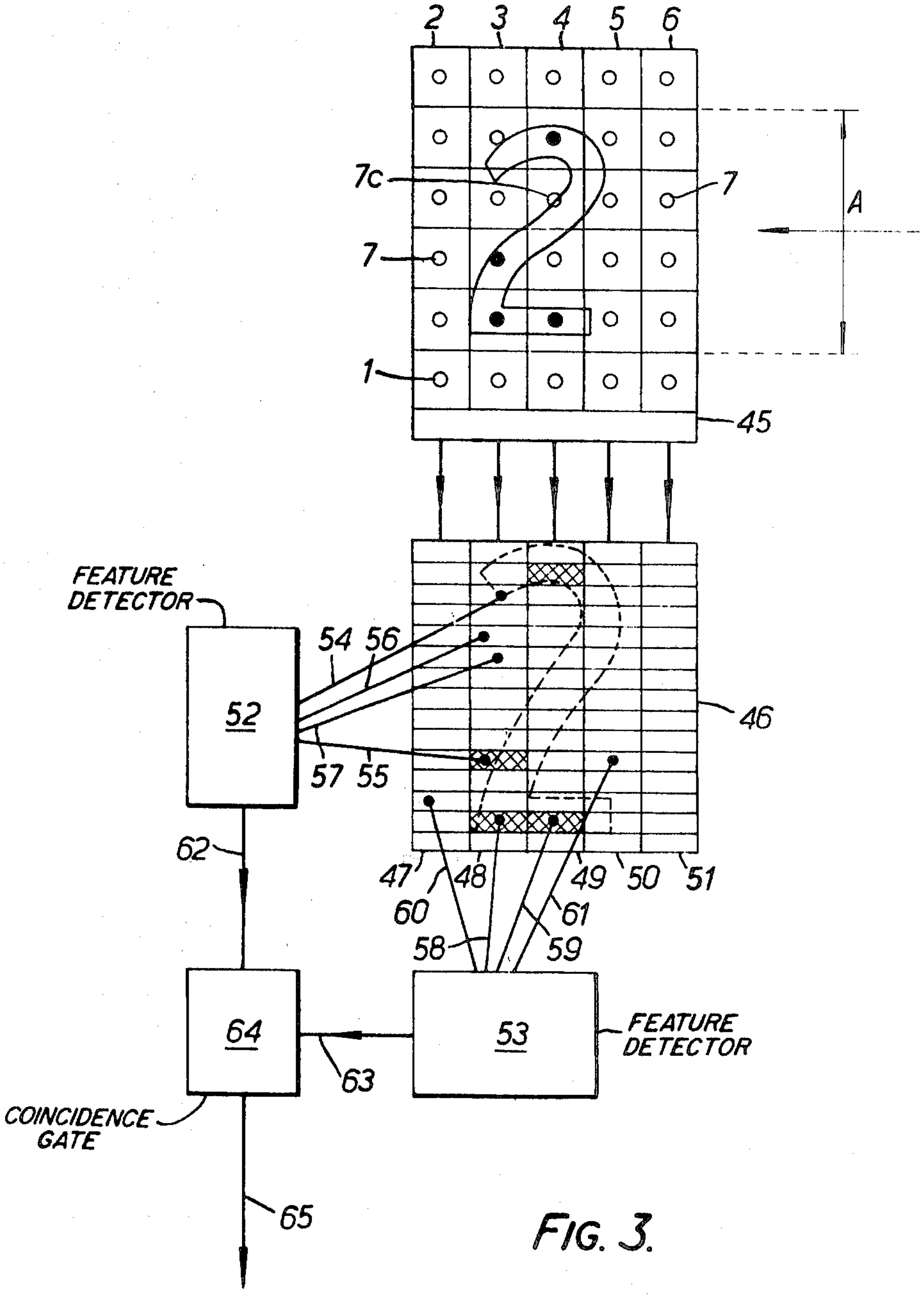

Some exemplary embodiments of the invention will now be described with reference to the accompanying drawings in which FIG. 1 is a generally block schematic diagram of an optical character recognition system embodying the invention, FIG. 2 is a circuit diagram of one form of feature detector, and FIG. 3 is a block schematic diagram of an alternative optical character recognition system.

Referring now to FIG. 1 a photohead matrix 1 comprising five columns 2, 3, 4, 5 and 6 of photodiodes. In a preferred arrangement of photohead, 72 photodiodes are utilized in each column but any convenient number may be used and for the purposes of this description, in the interest of drawing simplicity, six photo diodes 7 are shown schematically in each column.

Characters to be recognized are passed across the head in the direction of the arrow. In FIG. 1 a character 2 is shown positioned above the photodiode matrix and four of the photodiodes have been marked in heavy type to indicate that they carry a dark current electrical signal when the character is in the position shown (i.e. an electrical signal which corresponds to a dark state of a photodiode).

Assuming that the character is black and the background thereto is white the remaining photodiodes with the exception of photodiode 7*a* carry a light current signal. Photodiode 7*a* carries a current which is somewhere between the dark and light current since it is only partly exposed to the background and partly exposed to the character. Output lines 8 and 11 from photodiodes which carry a dark current when the character 2 is positioned as shown, and output lines 9 and 10 from photodiodes which carry a light current when the character 2 is positioned as shown are connected to a feature detector 16 which delivers an output on line 17 to a coincidence gate 18 when light and dark current obtain on these lines as specified. Thus an output from the feature detector is delivered when the character 2 is in the position shown in FIG. 1 but an output from this feature detector may also be delivered in response to the passage of a different character across the photohead. Lines 13, 14 and lines 12, 15 are similarly connected to a second feature detector 19 which in a similar manner provides an output to the gate 18 when the required input signals are applied thereto. This feature detector also is arranged to provide an output signal when there are dark currents on lines 13 and 14 and light current on lines 12 and 15 which is the situation which obtains when a character 2 is positioned as shown in FIG. 1 over the diode matrix.

It will be appreciated that an output may be generated from feature detector 19 during the passage of characters other than the character 2 over the matrix. It is only however when the feature detector 16 and the feature detector 19 respond simultaneously that an output signal is provided from the coincidence gate 18 on line 20. Though in this example only two feature detectors have been shown to sense the state in each case of only four photodiodes, it is envisaged that any number of feature detectors may be provided to suit the particular application each "looking at" or sensing the state of any predetermined number of photodiodes. In one contemplated arrangement 24 feature detectors are utilized, to each of which the outputs from 16 photodiodes are applied. It will be appreciated that under various lighting conditions, with different ink densities, the detection of black and white points would be difficult with a simple threshold detector which merely indicates that a signal above a certain level is black or white as the case may be. It is therefore an important aspect of the present invention to provide for the reliable detection of black or white states.

If for example black state signals are positive and white state signals are negative detection of a feature is indicated if the most negative of the positive black state signals is more positive by a predetermined voltage than the most positive of the negative white state signals. The information contained in the preceding sentence is most important and it is by applying the principle contained therein that reliable detection is afforded irrespective of light and ordinary print density variations.

Although many different circuits may be designed which operate according to this principle one specific example of a suitable circuit will hereinafter be described with reference to FIG. 2 wherein two assessor circuits are provided one assessor circuit affording an output signal which follows the most negative of a first group of input signals indicative of a black state for example and the other assessor circuit affording an output signal following the most positive of a second group of signals which indicate white states for example, the output from each circuit being applied to respective inputs of a comparator circuit which affords a final output signal in dependence upon the amplitude differential between the outputs from the respective assessor circuits.

Referring now to FIG. 2, in dotted boxes 21 and 21′ respectively two similar assessor circuits are shown which feed the comparator circuit shown in dotted box 22. Since the assessors 21 and 21′ are generally similar, corresponding parts will bear the same numerical designations, with parts of the assessor 21′ being distinguished by a dashed suffix. Each assessor is provided with eight input terminals only two of which 23 and 24 and 23′ and 24′ 24′ are shown. Assessor 21 provides an output signal at terminal 25 which corresponds to the most negative of its input signals and assessor 21′ provides an output signal at terminal 25′ which corresponds to the most positive of its input signals. The output signals from the two assessors are applied to the comparator circuit 22 which affords a final output signal in dependence upon the differential between the output signals from the assessor circuits 25 and 25′ respectively. In view of the fact that the assessor 21 and 21′ not only comprise generally similar components but also operate in a very similar manner conveniently the operation of assessor 21 only will now be explained.

The input terminal 24 of assessor 21 is coupled to the base of an input transistor 26 having its emitter connected to a conventional constant source shown in dotted box 27. The input transistor 26 feeds a transistor 28 which is connected in emitter follower configuration. An input circuit similar to the input circuit thus defined by transistors 26 and 28 and as shown in dotted box 29 is connected to each of the other input terminals. For example, the input circuit connected to terminal 23 is shown in dotted box 30 and comprises transistors 31 and 32 which correspond respectively to the input transistor 26 and the emitter follower connected transistor 28. The emitters of the emitter follower transistors 28 and 32 are connected to a common load resistor 33 the emitter contacts of the emitter follower transistors of input circuits associated with other input terminals are likewise similarly connected to the common load resistor 33. It will be appreciated therefore that in operation of the circuit, current will be supplied into the load resistor circuit 33 from the emitter follower transistor which is associated with that input transistor to which the most negative input signal is applied. For example, if the input terminal 24 had applied to it an input signal which was more negative than the input signal applied to any other input terminal, the base of transistor 28 would be more positive than the corresponding bases of other emitter followers and thus current dependent upon the magnitude of the input signal applied to the terminal 24 would be supplied to the load resistor 33 from the emitter follower transistor 28. Voltage developed across the load resistor 33 is applied at the base of a second emitter follower transistor 34 which is serially connected through its collector to the emitter of an output transistor 35 fed at its base from constant current source 27.

It will be appreciated therefore that the voltage at output point 25 will be equal to $V_{in}$ applied at terminal 24 (assuming that the voltage applied thereto is higher than the voltage applied to any other input terminal), $-V_{BE26}+V_{BE35}'$, where $V_{BE26}$ is the base emitter voltage of transistor 26 and $V_{BE35}$ is the base emitter voltage of transistor 35. Thus the output voltage at point 25 is the input voltage plus the voltage difference between base emitter voltage of transistor 26 and the base emitter voltage of transistor 35. If transistors having similar characteristics are used for 26 and 35′ and 26′ and 35 any difference in $V_{BE}$ between $V_{BE26}$ and $V_{BE35}$ will be cancelled in the comparator 22. The current through transistor 34 is controlled in accordance with the voltage developed across resistor 33 which is representative of the largest input signal. The assessor 21′ operates in a similar manner but corresponding transistors are of opposite polarity such that signals are developed across common load resistor 33′ in accordance with the most positive input.

It is desirable that a small offset voltage should be provided between the output signals at terminals 25 and 25′ and for this purpose in assessor 21 a current source 36 is provided having an adjustable resistor 37. This current flowing in resistor 37 provides the necessary voltage offset.

The comparator shown within the dotted box 22 comprises a long tailed pair consisting of transistors 38 and 39 to which signals from terminals 25 and 25′, respectively, are applied. Output signals developed at the collectors of the long tailed pair are applied to the inputs of transistors 40 and 41 which form a second long tailed pair. The output from the second long tailed pair is taken from the collector of transistor 41 and fed via transistor 42 and transistor 43 to output terminal 44. The comparator shown in dotted box 22 may therefore be considered as a differential amplifier, of a kind which is quite well known, wherein the digital output signal provided at terminal 44 is dependent upon the sign of the difference between the output signals at terminals 25 and 25′.

The circuit hereinbefore described thus constitutes a feature detector which is utilized to provide an indication when the most negative of one set of voltages is related by a certain differential to the most positive of another set of voltages.

Although the feature detection principle may be applied to signals passed directly from a photohead to feature detectors as shown in FIG. 1, the system of FIG. 1 is only suitable for the recognition of characters which are passed within a carefully defined region with respect to the photohead. In FIG. 1 it is necessary to pass the characters within the region defined by the dimension A. It is evident that if a character is not framed correctly within this region detection of feature signals transmitted directly from the photohead become impossible. In order to facilitate the decision of a character which is passed anywhere across the photohead in the direction of the arrow, the arrangement shown in FIG. 3 is proposed wherein the photohead 1 bears the same numerical designation as the photohead as shown in FIG. 1.

In this arrangement the columns 2 to 6 of the matrix are scanned successively by conventional scanning circuitry 45 the columns being scanned simultaneously in a time of 14.4 microseconds. Video signals from the scanning circuitry are fed into a delay unit 46 having five delay lines 47 to 51 each of which has 25 sections affording a delay of 0.2 of a microsecond each. Thus the total delay afforded by each delay line is 5 microseconds.

The length of the diode matrix in the direction of the columns is arranged to be equal to the length of three characters. The drawing however is only schematic and does not show this 3 to 1 relationship. Video information resulting from each 14.4 microsecond scan is passed through the delay lines. Since therefore a character must be fully scanned over its length in under 5 microseconds and the delay lines are 5 microseconds long, there will be an instant at which video information relating to a complete character is stored wholly within the delay unit 46 irrespective of the framing position of the character with respect of the diode matrix.

In FIG. 3 the delay unit 46 is shown schematically and the individual sections thereof which are cross-hatched are assumed to contain information characteristic of the character 2 which is shown in dotted lines. Other delay line sections, all of which are not shown, also carry information but only those which are sampled by feature detectors 52 and 53 have been cross-hatched. Thus black state signals are fed to feature detector 52 on lines 54 and 55 and white state signals are fed to this feature detector on lines 56 and 57. The feature detector 53 is fed in the same manner from lines 58 and 59 with black state signals and lines 60 and 61 with white state signals. It will be appreciated that the state of the signals carried by these lines only correspond to the above description when the character is in the position shown in the drawings. These feature detectors are of the kind described with reference to FIG. 2 and when contemporaneous signals emanate therefrom on lines 62 and 63 respectively, which feed a coincidence gate, an output will be provided from the coincidence gate on line 65.

An arrangement of the kind such as described with reference to FIG. 1 and FIG. 3 only facilitates the detection of contemporaneously detected features but as described in our co-pending British Pat. application No. 34245/68 and its corresponding U.S. Pat. application No. 841506 the feature detector output may be applied to a shift register thereby to facilitate the detection of features which have been recognized at different instants such detection being utilized for character recognition purposes.

What we claim is:

1. An optical character recognition system comprising, a photohead having a matrix of photosensitive elements providing signals the relative polarity of which is dependent upon the light to which they are exposed, a plurality of detectors each responsive to signals from first and second sets of a group of said elements a different group for each detector, wherein each said detector includes a signal comparator, a first signal assessor and a second signal assessor, the first signal assessor providing one input signal for the comparator corresponding to a most negative signal of signals from the said first set and a second signal assessor providing another input signal for the comparator corresponding to a most positive signal of signals from the said second set the comparator being arranged to provide an output signal indicative of the detection of a feature when the most negative signal from the first set is more positive than the most negative signal from the second set, and recognition indicator means responsive to such detection for providing a final output signal indicating the recognition of a character consequent upon the detection of a number of features common to that character.

2. An optical character recognition system as claimed in claim 1 wherein the said comparator includes differential voltage sensing means to provide the output signal indicative of the detection of a feature when the most negative signal of the first set is more positive than the most positive signal of the second set by a predetermined voltage.

3. An optical character recognition system as claimed in claim 2 in which the elements are photo diodes which are scanned successively.